Figure 1:
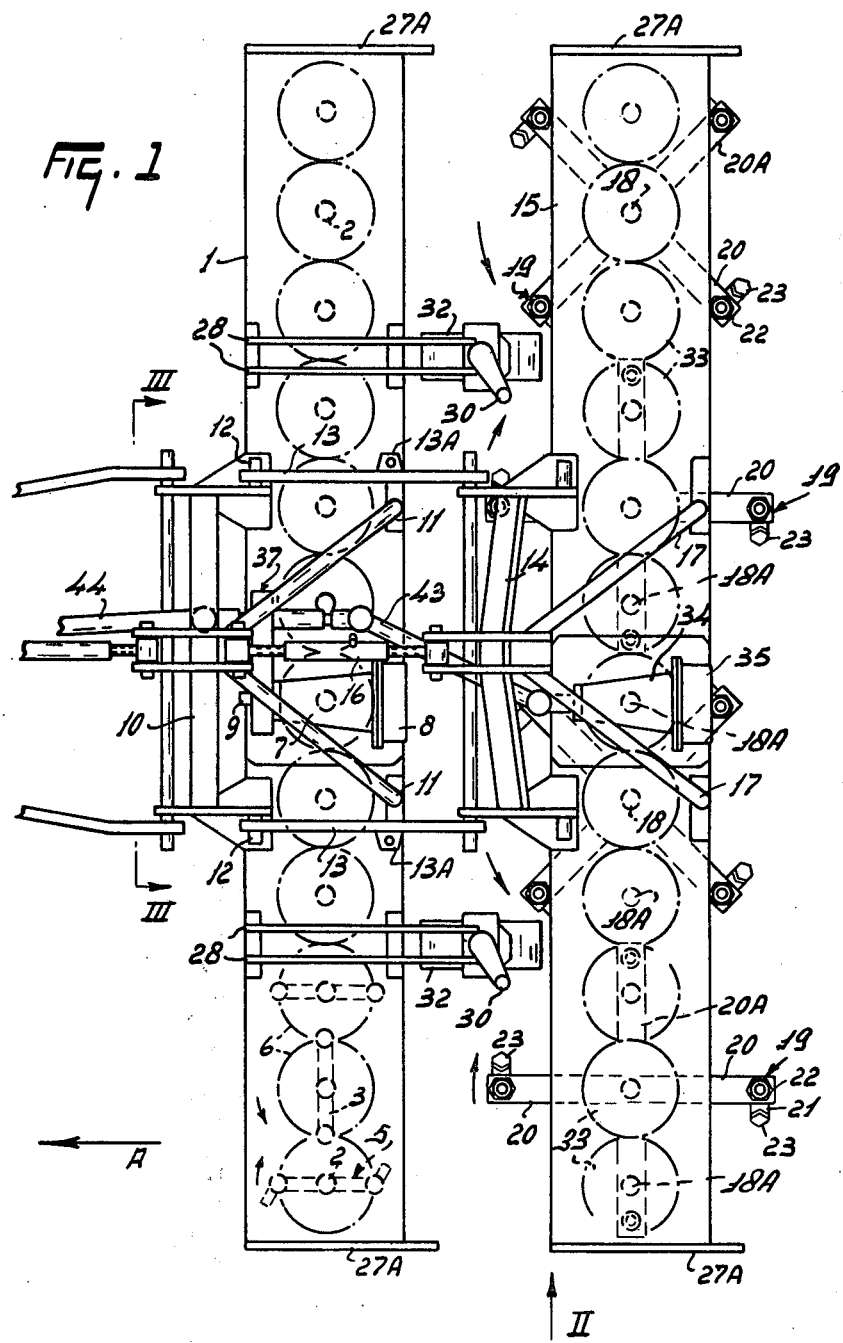

United States Patent [19]

van der Lely

[11] 4,148,363
[45] Apr. 10, 1979

[54] SOIL CULTIVATING IMPLEMENTS

[76] Inventor: Cornelis van der Lely, 7, Brüschenrain, Zug, Switzerland

[21] Appl. No.: 758,676

[22] Filed: Jan. 12, 1977

[30] Foreign Application Priority Data

Jan. 15, 1976 [NL] Netherlands .................. 7600363

[51] Int. Cl.² ........................................... A01B 33/06
[52] U.S. Cl. ..................................... 172/47; 172/52; 172/59; 172/96
[58] Field of Search ............... 172/51, 52, 56, 59, 172/96, 47, 49, 117, 382, 443, 677, 413

[56] References Cited

U.S. PATENT DOCUMENTS

| | | | |
|---|---|---|---|
| 1,295,281 | 2/1919 | Denny | 172/52 |
| 3,667,551 | 6/1972 | van der Lely | 172/59 |
| 3,826,314 | 7/1974 | van der Lely | 172/59 |
| 3,951,213 | 4/1976 | van der Lely | 172/59 |
| 3,977,476 | 8/1976 | van der Lely | 172/51 |
| 4,034,687 | 7/1977 | van der Lely | 172/52 |

FOREIGN PATENT DOCUMENTS

| | | | |
|---|---|---|---|
| 7311227 | 2/1975 | Netherlands | 172/51 |
| 7205221 | 10/1973 | Netherlands | 172/59 |

Primary Examiner—Richard J. Johnson
Attorney, Agent, or Firm—William B. Mason; Penrose Lucas Albright

[57] ABSTRACT

An implement assembly includes two elongated frame portions with respective coupling members that are linked to one another. Either frame portion can be leading or trailing and in a preferred arrangement, the leading frame portion has tined soil working members that work overlapping strips of top soil while the trailing frame portion has tined tools that work subsoil in non-overlapping paths. A common transmission can be fixed to either respective gear box that rotates the members and the tools. In either arrangment, the transmission is connected to the driving gears for both the members and the tools which can be rotated at different speeds from that of the members. A ground engaging wheel can be positioned at either side of the center of the assembly to bear on ground that is located between neighboring tools and/or members. The member can work paths of soil having different widths from those of the tools. The tools can be formed of horizontal carriers that are resiliently mounted in connectors with elastic elements that are located within a housing surrounding each carrier.

11 Claims, 6 Drawing Figures

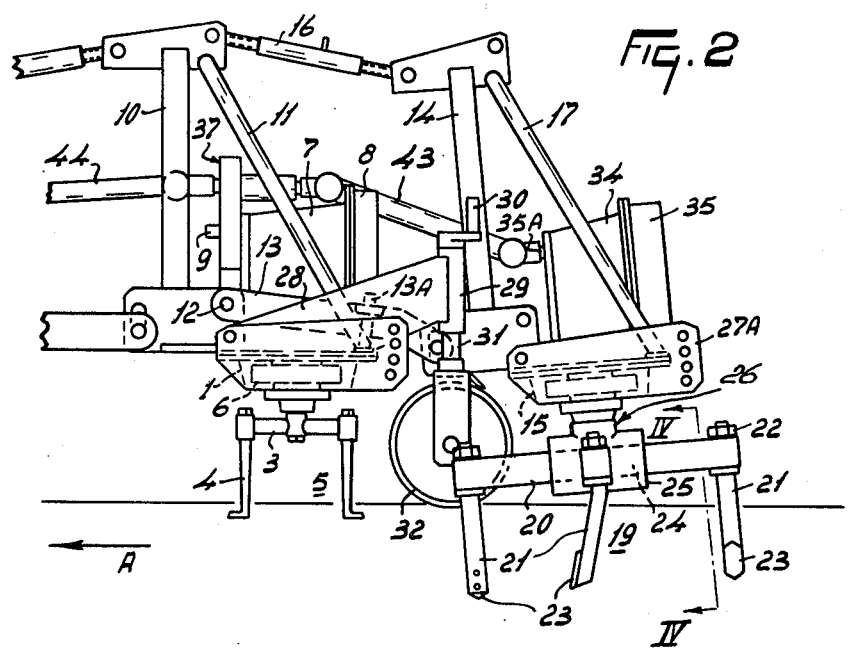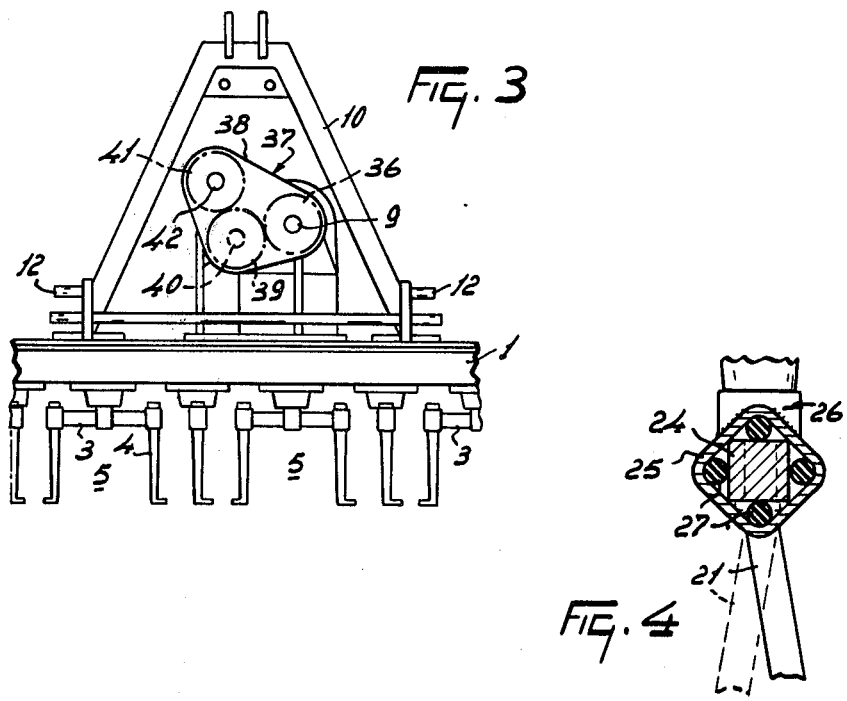

SOIL CULTIVATING IMPLEMENTS

According to one aspect of the invention, there is provided a soil cultivating implement of the kind set forth, wherein two rows of said members/tools are provided that lie one behind the other with respect to said direction, and wherein the distances between the axes of rotation of the successive members/tools of one of said two rows are substantially equal and are different from the distances between the axes of rotation of the members/tools of the other one of said two rows.

Figure 5:
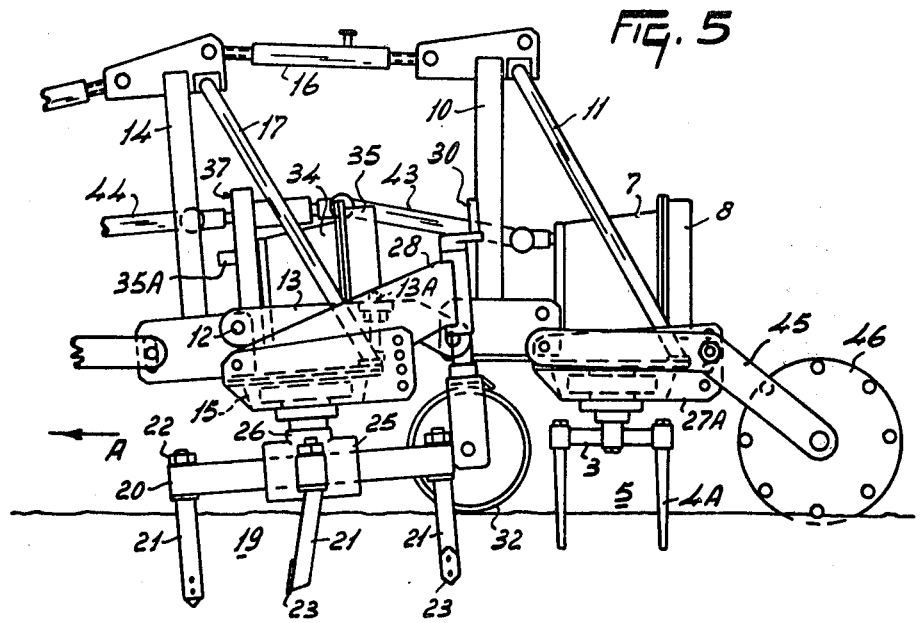
Figure 6:
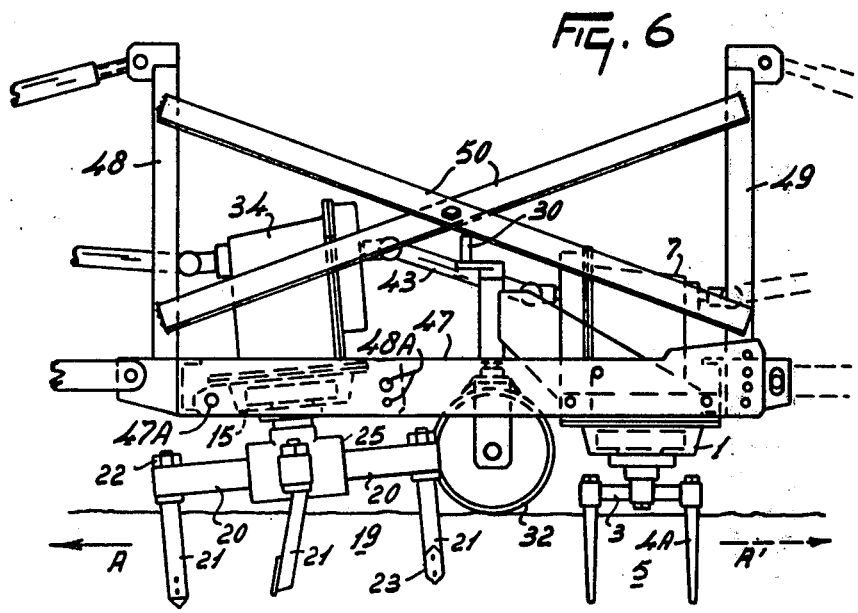

For a better understanding of the invention, and to show how the same may be carried into effect, reference will now be made, by way of example, to the accompanying drawings, in which:

FIG. 1 is a plan view of a soil cultivating implement in accordance with the invention connected to the rear of an agricultural tractor, FIG. 2 is a side elevation as seen in the direction indicated by an arrow II in FIG. 1, FIG. 3 is a front elevation as seen in the direction indicated by arrows III—III in FIG. 1 but with the omission of some parts, FIG. 4 is a section, to an enlarged scale, taken on the line IV—IV in FIG. 2, FIG. 5 is a similar side elevation to FIG. 2 but illustrates parts of the implement arranged in alternative positions, and FIG. 6 is a further side elevation that is similar to FIGS. 2 and 5 but that illustrates an alternative form of soil cultivating implement in accordance with the invention.

Referring firstly to FIGS. 1 to 5 of the accompanying drawings, the soil cultivating implement that is illustrated therein has a leading hollow box-shaped frame portion 1 that extends substantially horizontally transverse, and usually substantially perpendicular, to the intended direction of operative travel of the implement that is indicated in FIGS. 1, 2, 5 and 6 of the drawings by an arrow A. A plurality (of which there are twelve in the example that is being described) of substantially vertical, or at least upwardly extending, shafts 2 are rotatably journalled in the hollow frame portion 1 so as to lie in a single row with the axes of rotation of the sheets 2 spaced apart from one another at regular intervals which advantageously, but not essentially, have magnitudes of substantially 25 centimeters. The lowermost end of each shaft 2 projects from beneath the bottom of the hollow frame portion 1 and is there splined or otherwise keyed so as firmly but releasably to receive a matchingly splined or otherwise keyed hub at the center of a corresponding substantially horizontally disposed tine support or carrier 3. The opposite ends of each tine support or carrier 3 are provided with two substantially cylindrical sleeve-like tine holders whose axes are parallel or substantially parallel to the axis of rotation of the shaft 2 concerned, said tine holders firmly but releasably receiving the fastening portions of corresponding rigid soil working tines 4. In addition to its fastening portion, each tine 4 also comprises a soil working portion that projects downwardly towards the ground surface from the corresponding support or carrier 3 so as to penetrate into the soil when the implement is in operation. Each tine support or carrier 3, together with the corresponding tine holders and tines 4, constitutes a rotary soil working or cultivating member that is generally indicated by the reference 5.

FIGS. 2 and 3 of the drawings show that the downwardly extending soil working portion of each tine 4 has a laterally projecting foot at its lowermost end, said feet being in perpendicular, or substantially perpendicular, relationship with the axes of rotation of the corresponding shafts 2. The bottom left-hand rotary soil working or cultivating member 5 as seen in FIG. 1 of the drawings illustrates the angular dispositions of said feet around the longitudinal axes of the soil working portions of the corresponding tines 4. Each shaft 2 is provided, inside the hollow frame portion 1, with a corresponding straight-toothed or spur-toothed pinion 6, said pinions 6, like the shafts 2, being arranged in a single row and being so dimensioned that the teeth of each pinion 6 are in mesh with those of its neighbour, or with those of both of its neighbours, in the single row of the twelve pinions 6 that are provided in the example that is being described. It will be realised that, with this arrangement, each shaft 2 will revolve, with the corresponding soil working or cultivating member 5 and pinion 6, in a direction that is opposite to the direction of rotation of the or each immediately neighbouring similar assembly when the implement is in operation, The opposite intended directions of operative rotation of two such assemblies are indicated by small arrows at the bottom left-hand corner of FIG. 1 of the drawings.

One of the center pair of the shafts 2 has an upward extension through the top of the hollow frame portion 1 into a gear box 7 that is fastened to the top of said frame portion 1. Bevel pinions that are not visible in the drawings place the upward extension of said one of the shafts 2 in driven connection with a substantially horizontal shaft (also not visible in the drawings) which extends substantially parallel to the direction A. A second substantially horizontal shaft 9 is in parallel relationship with the substantially horizontal shaft (not visible) that has just been discussed and is disposed vertically thereabove in space relationship therewith. The rear ends of the two substantially horizontal shafts of the gear box 7 both project through the back of the gear box 7 into a change-speed gear 8 mounted on the gear box 7 at the rear thereof. It is not necessary to describe the construction and arrangement of the change-speed gear 8 in any detail for the purposes of the present invention but, briefly, it comprises co-operating pairs of straight-toothed or spur toothed pinions of different sizes whose hubs are internally splined or otherwise keyed for selective co-operation with the matchingly splined or keyed ends of the two shafts that project through the back of the gear box 7 into the change-speed gear 8. The particular pair of pinions that is selected of co-operation with said shaft ends, and the particular arrangement thereof that is adopted relative to those shaft ends, dictates the transmission ratio between the shaft 9 and the underlying shaft that is substantially parallel thereto and thus the speed at which the soil working or cultivating members 5 will be rotated in response to a more or less constant speed of rotation of the shaft 9.

The front of the frame portion 1 is provided, misway across the width thereof, with a coupling member or testle 10 that is of substantially triangular configuration (see FIG. 3). Substantially the apex of the coupling member or trestle 10 is rigidly connected by two downwardly and rearwardly (with respect to the direction A) divergent tie beams 11 to the top and rear of the hollow frame portion 1. The bottom of the coupling member or trestle 10 comprises two substantially vertical plates that are parallel to one another and substantially parallel to the direction A, rear portions of said two plates being provided with stub shafts 12 whose axes are aligned in a substantially horizontal direction that is parallel to the transverse length of the hollow frame portion 1 and thus substantially perpendicular to the direction A. Two arms 13 extend rearwardly with respect to the direction A from the respective stub shafts 12 and are turnable upwardly and downwardly about those stub shafts. Leading portions of the arms 13 that are located above the hollow frame portion 1 are of rectilinear configuration but rear portions thereof that are located behind said frame portion 1 are bent over downwardly (see FIG. 2). The rearmost ends of the downwardly bent-over rear portions of the arms 13 are pivotally connected by the opposite ends of a horizontal shaft to the bottom of a second coupling member or trestle 14 that is rigidly secured to the front of a second hollow box-shaped frame portion 15 which is substantially identical in construction and disposition to the leading hollow frame portion 1, the paths of travel of the two frame portions 1 and 15 being in substantially exactly coinciding relationship. Pairs of vertical plates at the tops of the two coupling members or trestles 10 and 14 are pivotally interconnected by a rod 16 whose length is adjustable in a manner that is well known per se and that can be seen in FIGS. 1, 2 and 5 of the drawings. The pair of plates at the top of the second coupling member or trestle 14 is, additionally, rigidly connected to two laterally spaced apart locations at the top and rear of the second frame portion 15 by two tie beams 17 that diverge downwardly and rearwardly, with respect to the direction A, from said pair of plates to the frame portion 15. The second frame portion 15 is provided with a plurality (in this case, twelve) of substantially vertical, or at least upwardly extending, shafts 18 and 18A, said shafts 18 and 18A, like the shafts 2, being arranged in regularly spaced apart relationship with their longitudinal axes (axes of rotation) at distances from one another which advantage-ously, but not essentially, have magnitudes of substantially 25 centimeters. The shafts 18 and 18A are conveniently identical to each other and to the shafts 2 and the difference between them is that the shafts 18 carry corresponding rotary soil cultivating tools 19 whereas the shafts 18A do not. There are four of the shafts 18 and of the tools 19 and said shafts 18 are the second, fifth, eighth and eleventh shafts along the row of twelve shafts 18 and 18A counting from either end of that row. It is, of course, necessary that the shafts 18 should project from beneath the bottom ot the hollow frame portion 15 to have the tools 19 releasably secured to them whereas it is not actually necessary that the "idle" shafts 18A should project downwardly from beneath the bottom of the frame portion 15 although, as previously mentioned, less different parts are necessary if the shafts 18 and 18A are identical and are also identical to the shafts 2.

Each rotary soil cultivating tool 19 comprises two supports or carriers 20 and two further supports or carriers 20A, the four supports or carriers 20 and 20A being arranged in cruciform relationship as viewed in a direction parallel to the longitudinal axis (axis of rotation) of the corresponding shaft 18. The radially outermost ends of the supports or carriers 20 and 20A are formed with substantially vertical or at least upwardly extending holes and fastening portions of corresponding rigid soil working tines 21 are firmly but releasably retained in those holes by nuts 22 mounted on short screwthreaded upper parts of said fastening portions.

The lower ends of the fastening portions of the tines 21 make angular junctions with straight downwardly extending soil working portions of the tines which soil working portions are orientated forwardly from upper root to lower tip so as to "lead" with respect to the intended directions of operative rotation of the corresponding tools 19 (see the arrows in FIG. 1 of the drawings). A lowermost free end or tip region of the soil working portion of each tine 21 is provided with a corresponding replaceably mounted chisel-shaped blade 23.

In the embodiment that is illustrated by way of example in the accompanying drawings, each of the supports or carriers 20 and 20A has a polygonal cross-section which, it is preferred, should be the square one that is depicted. The two supports or carriers 20 of each tool 19 are in diametrically opposite alignment with one another and perpendicular relationship with the corresponding pair of diametrically opposed supports or carriers 20A. An elongate connector 24 of square cross-section co-operates connectingly with the inner ends of the matching cross-section supports or carriers 20 of each tool 19 and is located inside a hollow sleeve-like housing 25 that is also of substantially square cross-section. However, as can be seen in FIG. 4 of the drawings, the housing 25 is of larger size than is the elongate connector 24 and is turned through 45° about its own longitudinal axis relative to the connector 24 so that, as seen in FIG. 4, the four corners of the connector 24 touch the inner surfaces of the four sides of the hollow housing 25 at the midpoints of those four sides. Each housing 25 forms part of a hub 26 that has an upwardly directed central portion that is fastened to the downwardly projecting end of the corresponding shaft 18. The two supports or carriers 20A of each tool 19 have their inner ends located against the connector 24 between the two supports or carriers 20. With the relative arrangement of the connectors 24 and housings 25 that has been described above and that can be seen in FIG. 4 of the drawings, elongate elements 27 of circular cylindrical configuration are arranged between the four flat sides of each connector and the four internal angular corners of the corresponding housings 25, said elements 27 being formed from an elastomeric material such as natural rubber or a synthetic plastics material having elastomeric properties. The relative dimensions of the parts 24, 25 and 27 are such that the elements 27 are resiliently clamped in their appointed positions and enable the connectors 24 and the supports or carriers 20 that are coupled to them to turn about their own longitudinal axes to some extent relative to the holders 25 against their own elastically resilient opposition. The supports of carriers 20A being secured in the housing 25 of the tool 19 concerned as is described for the connector 24. As an alternative, the connector or connectors 24 that correspond to the two supports or carriers 20 of each tool 19 may be arranged either above, or beneath, the connector or connectors 24 that correspond to the two supports or carriers 20A of the same tool 19, both pairs of supports or carriers 20 and 20A then being resiliently mounted in the same manner so as to be turntable, against the resilient opposition of the elastomeric elongate elements 27, about their own longitudinal axes.

The opposite ends of both the two hollow frame portions 1 and 15 are closed by substantially vertical side plates 27A that extend substantially vertically parallel to one another and to the direction A, each side plate 27A being somewhat sector-shaped so as to have a portion which projects rearwardly with respect to the direction A beyond the back of the respective frame portion 1 or 15, said rearwardly projecting portion being formed with a curved row of holes. The leading hollow frame portion 1 is provided at two locations which are spaced by equal distances from its midpoint with pairs of substantially vertical support plates 28 that are inclined obliquely upwardly and rearwardly with respect to the direction A from the top of said frame portion 1 (see FIG. 2). The upper and rear ends of the two support plates 28 of each pair are rigidly secured to a corresponding substantially vertical sleeve 29 whose lower end receives an upper portion of a corresponding arm 31. The arms 31 are upwardly and downwardly displaceable in the sleeves 29, in a manner that is known per se, by manual rotation of crank handles 30 that project from the upper ends of the sleeves 29 and that are connected to screwthreaded spindles. The lower end of each arm 31 is secured to the base of a corresponding forked bracket whose limbs carry the axle of a corresponding supporting member that is in the form of a ground wheel 32 located between the limbs of the respective forked bracket. The axes of rotation of the two ground wheels 32 that coincide with their axles are both substantially horizontally perpendicular to the direction A and when, as will usually be the case, the two arms 31 are set at equal positions of extension relative to the two sleeves 29 the two axes of rotation will be coincident.

It will be noted from FIG. 1 of the drawings that, as viewed from the rear in the direction A, each supporting ground wheel 32 is located midway between the axes of rotation of a corresponding pair of the four rotary soil cultivating tools 19, their positions being such that they just avoid being fouled by the tines 21 of said tools 19 when the latter are being positively rotated. This arrangement of the supporting ground wheels 32 between strips of soil that are worked by the respective tools 19 of neighbouring pairs thereof enables the frame portion 15 to be disposed quite close behind the frame portion 1 with respect to the direction A and thus facilitates a compact construction of the whole implement.

Each of the shafts 18 and 18a is provided, inside the second hollow frame portion 15, with a corresponding straight-toothed or spur-toothed pinion 33, said pinions 33, like the shafts 18 and 18A, being arranged in a single row and being of such a size that the teeth of each pinion 33 are in mesh with those of its immediate neighbour, or with those of both of its immediate neighbours, in the single row of pinions. One shaft 18A which is one of the center pair of shafts 18 and 18A of the row thereof has an upward extension through the top of the second hollow frame portion 15 into a gear box 34 that is mounted on top of said frame portion. The upward extension of the shaft 18A is in driven connection with a substantially horizontal shaft 35A (FIG. 2) of the gear box 34 in an exactly analogous manner to that which has already been described for the gear box 7, the rear of the gear box 34 being provided with a change-speed gear 35 that is equivalent in construction and operation to the change-speed gear 8 that has been briefly described above. The leading end of the shaft 9 projects forwardly from the front of the gear box 7 and the leading end of the shaft 35A projects forwardly from the front of the gear box 34, both of said leading ends being splined or otherwise keyed to enable them to be positively rotated. As shown in FIG. 3 of the drawings, the leading forwardly projecting end of the shaft 9 also carries a straight-toothed or spur-toothed pinion 36 that forms part of a transmission 37 arranged inside a housing 38 which is fastened to the front of the gear box 7. The teeth of the pinion 36 are in mesh with those of an identical rotary pinion 39 carried by a stub shaft 40 that is supported by the walls of the housing 38. The teeth of the pinion 39 are, in turn, in mesh with those of a further identical pinion 41 fastened to a shaft 42 which is rotatably mounted in the housing 38 with both its front, and rear, ends, with respect to the direction A, projecting fore and aft from said housing. The shaft 42 is substantially horizontally parallel to the shaft 9 and its rearmost end is drivingly connected to the substantially horizontal shaft 35A that projects forwardly from the front of the gear box 34 by a telescopic transmission shaft 43, which is of a construction that is known per se, having universal joints at its opposite ends.

In the use of the soil cultivating implement that has been described, the leading frame portion 1 that carries a transverse row of the rotary soil working or cultivating members 5 has its coupling member or trestle 10 connected to the three-point lifting device or hitch at the rear of an agricultural tractor or other operating vehicle, the connection being established in a manner that is generally known per se employing the stub shafts 12 and a substantially horizontal pivot co-operating with the pair of substantially vertical plates at the top of said member or trestle 10. The maximum depth to which the tines 4 of the rotary soil working or cultivating members 5 should be capable of penetrating into the soil will depend upon the nature and condition of that soil and, to some extent, upon the particular purpose for which the worked soil is intended at the end of the cultivation. Accordingly, before work actually commences, the supporting ground wheel 32 are bodily raised or lowered relative to the frame portion 1 by rotating the crank handles 30 in appropriate directions to extend the arms 31 further from, or to withdraw them further into, the substantially vertically disposed sleeves 29. It will be apparent from a study of FIG. 2, in particular, of the drawings that this adjustment is the principal factor which will control the maximum depth of penetration of the tines 4 into the soil during operation. Generally speaking, and as illustrated, the ground wheels 32 will be set at such levels relative to the frame portions 1 that the tines 4 of the members 5 will penetrate into the ground only so far that they will work a relatively shallow uppermost layer of top soil, principally by operation of the substantially perpendicularly projecting feet that are formed at their lowermost ends. The depth to which the tines 21 of the rotary soil cultivating tools 19 that are carried by the second frame portion 15 can penetrate into the soil is controlled by varying the setting of adjustable stops 13A that interconnect the arms 13 and the top of the hollow frame portion 1 at locations which are close to the points at which the rearmost and lowermost ends of the two tie beams 11 are secured to the top of said frame portion 1 at the rear thereof. As can be seen in FIG. 2 of the drawings, the length of the arm 16 is adjusted to such a setting that the axes of rotation of the soil cultivating tools 19, which are embodied in the shafts 18, are not strictly vertically disposed but are inclined by a few degrees to the vertical in such a way that the upper ends of said shafts 18 are a little further advanced with respect to the direction A than are the lower ends thereof. The implement will usually be so adjusted that the tines 21 of the tools 19 penetrate to a considerably greater depth into the soil than do the tines 4 of the members 5 to enable said tines 21, and particularly their blades 23, to work a layer of sub-soil beneath the layer of top soil that is cultivated by the tines 4 and, with the inclined disposition of the axes of rotation of the tools 19 that has just been discussed, said tines 21 are able to work the sub-soil more intensively, their action being such as to promote an upward and downward displacement of the sub-soil as well as stirring thereof.

The leading end of the shaft 42 of the detachably mounted transmission 37 constitutes a drive coupling point of that transmission and, during operation, is placed in driven connection with the rear power take-off shaft of the agricultural tractor or other operating vehicle of the implement by way of an intermediate telescopic transmission shaft 44, that is of a construction which is known per se, having universal joints at its opposite ends. The rearmost end of the shaft 42 transmits rotary drive to the gear box 34, and thus to the tools 19, by way of the telescopic transmission shaft 43 but the transmission 37 also drives the leading input end of the shaft 9 of the gear box 7 by way of the pinions 41, 39 and 36. The transmission members between the shaft 42 and the shafts 2 and 18 are so arranged that, during operation, the soil working or cultivating members 5 and cultivating tools 19 revolve in the directions that are indicated by arrows in FIG. 1 of the drawings. The effective working width of each of the rotary soil working or cultivating members 5 is somewhat greater than is the regular distance (preferably substantially 25 centimeters) between the axes of rotation of the shafts 2 so that, during operation, the strips of soil that are worked by the individual members 5 overlap one another to produce, in effect, a single broad strip of worked land. The short tines 4 cultivate only a relatively shallow layer of top soil whereas the longer tines 21 of the four rotary soil cultivating tools 19 that are supported by the second frame portion 15 penetrate much more deeply into the ground and tend to displace lumps of soil generally rearwardly with respect to the direction A. The combined effect is to produce a somewhat rough soil surface having an underlying broken sub-soil layer that is permeable to air and water. This condition of the soil is a particularly suitable one in which to leave fields for wintering. Each of the rotary soil cultivating tools 19 has an effective working width of substantially 70 centimeters and the distance between the axes of rotation of the four successive shafts 18 is substantially 75 centimeters so that, in contradistinction to the members 5, the working widths of the four tools 19 do not actually overlap one another. It is preferred that, under most operating conditions, the rotary soil working or cultivating members 5 of the leading row should revolve at a higher speed than do the cultivating tools 19 of the rear row and this operating condition is readily brought about by appropriate adjustments of the change-speed gears 8 and 35 that are fastened to the backs of the respective gear boxes 7 and 34.

The implement that has been described above comprises two rows of power-driven rotary members or tools 5 and 19 that revolve, during operation, about substantially vertical, or at least upwardly extending, axes. The implement is capable, in a single traverse of the land, of crumbling an upper layer of top soil by way of the faster revolving members 5 and of immediately subsequently breaking up the sub-soil, to a considerably greater depth, by way of the tools 19 that are arranged to revolve at a lower speed than the members 5. Altough only two rows of the members 5 and tools 19 have been described, this is not essential and there could, if desired, be more than two rows of such members and/or tools. The form of soil treatment of which the implement is capable that has just been mentioned is particularly suitable for administration to harvested land just prior to a winter period. As seen in side elevation (FIG. 2), the region worked by the members 5 is spaced forwardly in the direction A from the region worked by the tools 19 and this arrangement tends to avoid clogging of said members 5 and tools 19 by the residues of previously harvested plants and the like.

Altough not illustrated in the accompanying drawings, the parts which pivotally interconnect the two hollow frame portions 1 and 15 may include at least one spring or other resilient mechanism arranged to allow one frame portion to move, against resilient opposition, relative to the other. This can be advantageous, particularly when the implement is to be used on very uneven ground. If any of the tines 21 of the rear row of rotary soil cultivating tools 19 should encounter stones or other firmly embedded obstacles, such "blocked" tines can deflect to avoid those obstacles without becoming damaged or broken as a result of the resilient mountings of their supports or carriers 20 and 20A, each such support or carrier 20 or 20A being capable of turning against resilient opposition about its own longitudinal axis. If, as has been mentioned above, the pairs of supports or carriers 20 and 20A are in axial alignment with one another and are integrally or rigidly interconnected, then the rearward (with respect to the direction of rotation of the corresponding tool 19) deflection of one tine 21 to avoid an obstacle brings about the forward (with respect to the same direction) deflection of the substantially diametrically opposed tine 21. Since it will nearly always be that tine 21 of any tool 19 that is foremost with respect to the direction A when it encounters an obstacle, the diametrically opposed tine 21 that is then rearmost with respect to the direction A will be penetrating less steeply into the soil (see FIG. 2) and will therefore not oppose deflection of the "blocked" tine 21 very strongly. This arrangement is of significant practical advantage.

Each of the hollow frame portions 1 and 15 has its own coupling member or trestle 10 and 14 and both of those coupling members or trestles are constructed and arranged so as to be capable of co-operating with the three-point lifting device or hitch of an agricultural tractor or other operating vehicle. Thus, either of the two frame portions 1 and 15 and the parts which it carries can be connected separately and indivudually to the three-point lifting device or hitch of an agrigultural tractor or other operating vehicle upon disconnecting the arms 13 and their stops 13A and making some other minor re-arrangements. Such re-arrangements include, in the case of the leading frame portion 1, removing the supporting ground wheels 32 and their mountings and substituting a single supporting member which extends throughout substantially the whole of the working width of the members 5 at a location behind those members 5 with respect to the direction A. The supporting member in question can conveniently, but not essentially, be a substantially cylindrical ground roller 46 of open formation (see FIG. 5) which ground roller is connected to the side plates 27A of the frame portion 1 by arms 45 that are turnable upwardly and downwardly alongside said plates 27A about substantially horizontally aligned pivots that are located at the tops and fronts of the plates 27A with respect to the direction A. As previously mentioned, each side plate 27A is formed, close to its rearmost edge, with a curved row of holes that are equidistant from the axis defined by the substantially horizontally aligned pivots and each arm 45 is formed with a single hole that can be brought into register with any chosen one of the corresponding curved row of holes. Locking bolts or other locking members are entered through the holes in the arms 45 and the selected holes in the side plates 27A to determine the level of the axis of rotation of the roller 46 relative to that of the frame portion 1 and thus the maximum depth to which the tines of the rotary soil working or cultivating members 5 will be able to penetrate into the ground when the implement is in use.

It is not essential that the two frame portions 1 and 15 and the parts which they carry should be arranged as illustrated in FIGS. 1 to 3 of the drawings and FIG. 5 illustrates an alternative arrangement in which the frame portion 15 is in advance of the frame portion 1 with respect to the direction A. The supporting ground wheels 32 and their mountings (including the support plates 28) are transferred from the frame portion 1 to the frame portion 15 and the frame portion 1, which is the rear frame portion in the arrangement of FIG. 5, has its end plates 27A provided with the arms 45 that are referred to in the preceding paragraph, the single supporting ground roller 46 being arranged rotatably between the rearmost ends of said arms 45 so as to extend throughout substantially the whole of the working width of the rotary soil working or cultivating members 5. The tines 4 are replaced by alternative tines 4A whose lower soil working portions are straight throughout their lengths instead of being provided with perpendicularly projecting feet. The tines 4A will usually be arranged to penetrate into the soil to a some what greater depth than are the tines 4 but this depth will not be as great as in the depth of penetration of the tines 21 of the tools 19. The transmission 37 is removed from the front of the gear box 7 and is, instead, arranged at the front of the gear box 34 to co-operate drivingly with the rotary input shaft 35A of that gear box. The telescopic transmission shaft 43 is arranged drivingly to interconnect the rear end of the shaft 42 of the transmission 37 and the forwardly projecting rotary input shaft 9 of the gear box 7. When the implement is arranged in this way, the leading soil cultivating tools 19 coarsely crumble both the sub-soil and the top soil and this action is substantially instantaneously followed by much finer crumbling of the top soil by the tines 4A of the members 5. The result is to produce, usually in a single traverse of the land by the implement, a soil consistency that is very suitable for use as a seed bed or for the introduction of young plants that are to grow on to maturity.

FIG. 6 of the drawings illustrates an alternative form of implement in accordance with the invention in which the majority of the parts thereof are similar, or identical, to parts that have already been described above with reference to FIGS. 1 to 5 of the drawings. Consequently, such parts are indicated in FIG. 6 by the same reference as are employed in FIGS. 1 to 5 and will not be described in detail again. As illustrated in FIG. 6, the implement again, as in the case of FIG. 5, has the frame portion 15 with its rotary soil cultivating tools 19 arranged in advance of the frame portion 1 and its rotary soil working or cultivating members 5. However, in the embodiment of FIG. 6, the frame portion 1 retains the supporting ground wheels 32 and their mountings and is reversed in position, as regards its front and its rear, as compared with its disposition in the arrangement of FIG. 5. Moreover, in the embodiment of FIG. 6, both the frame portion 15 and the frame portion 1 are mounted on a rigid carrier assembly 47 which includes two coupling members or trestles 48 and 49 that are symmetrically identical, or at least similar, to one another and that are both similar to the previously described coupling members or trestles 10 and 14. The coupling member or trestle 48 is at the front of the carrier assembly 47 with respect to the direction A whereas the coupling member or trestle 49 is at the rear thereof. The upwardly convergent sides (see the coupling member or trestle 10 in FIG. 3) of the two coupling members or trestles 48 and 49 are rigidly interconnected by corresponding pairs of strip-shaped cross braces 50 to ensure adequate rigidity of the whole assembly 47. Only the ground wheels 32 are employed in the embodiment of FIG. 6 of the drawings, the roller 46 not normally being used. The supporting ground wheels 32 lie between the leading row of cultivating tools 19 with respect to the direction A and the rear row of rotary soil working or cultivating members 5. It will be evident from a study of FIG. 6 of the drawings that, in addition to the coupling member or trestle 48 being capable of being connected to the three-point lifting device or hitch of an agricultural tractor or other operating vehicle to enable the implement to move operatively in the direction A, the other coupling member or trestle 49 can be used as an alternative to enable the implement to proceed operatively in a direction A' which is opposite to the direction A. The arrangement for operative progress in the direction A' is shown in broken lines in FIG. 6. Thus, the row of cultivating tools 19 is foremost with respect to the direction A when the coupling member or trestle 48 is used for connection to the agricultural tractor or other operating vehicle whereas the row of rotary soil working or cultivating members 5 is foremost with respect to the direction A' when the alternative coupling member or trestle 49 is used.

FIG. 6 shows, in full lines the arrangement that is desirable for operative progress in the direction A and it will be noted that the previously described inclination of the axes of rotation of the tools 19 to the strict vertical is maintained for the reasons that have been discussed above. The frame portion 15 is connected to side members of the carrier assembly 47 by substantially horizontally aligned pivots 47A and is retained, together with the parts which it carries, in the disposition that is illustrated in FIG. 6 of the drawings by entering bolts through an upper pair of holes 48A in said side members of the carrier assembly 47. It will be realised that, when operative progress in the direction A' is required, the inclinations of the axes of rotation of the tools 19 to the strict vertical should be changed so that said axes will be upwardly and forwardly inclined from ground level relative to the direction A' as they are in relation to the direction A. The achieve this, the retaining bolts entered through the upper holes 48A are temporarily removed and the frame portion 15 is turned downwardly about the axis defined by the pivots 47A until said bolts can co-operate with alternative lower holes 48A. The bolts are then replaced to maintain the required attitudes of the soilcultivating tools 19. It is noted that, in the embodiment of FIG. 6 of the drawings, the tines 4A which have straight soil working portions are again used in the soil working or cultivating members 5 in preference to the shorter tines 4 having perpendicularly projecting feet.

Both of the implements that have been described provide two rows of power-driven rotary soil working members and cultivating tools which rows can be arranged one behind the other with respect to the intended direction of operative travel in either order. The members/tools of the two rows have soil working tines of different lengths and can thus till the soil to different depths, the members/tools of the two rows being driven by transmissions that include the facility of enabling the members/tools of the two rows to be revolved at significantly different speeds. Such an implement can be very effective in working heavy soils that are in a wet condition, particularly in the spring and autumn seasons.

Although certain features of the soil cultivating implements that have been described and that are illustrated in the accompanying drawings will be set forth in the following claims as inventive features, it is emphasised that the invention is not necessarily limited to those features and that it includes within its scope each of the parts of each soil cultivating implement that has been described, and/or that is illustrated in the accompanying drawings, both individually and in various combinations.

What I claim is:

1. A soil cultivating implement assembly comprising two elongated frame portions linked to one another with a linkage and said portions each extending transverse to the direction of travel, a leading frame portion supporting a front row of rotatable soil working members that are driven to rotate about corresponding upwardly extanding shafts, a trailing frame portion mounting a rear row of soil working tools journalled in said trailing frame portion to rotate about respective upwardly extending axes, driving means connected to positively rotate said working members and said tools, the distance between the axes of rotation of neighboring tools being substantially equal but different from the distances between neighboring shafts of said soil working members, said row of working members and row of tools being positioned one behind the other to successively work the ground, coupling means on said assembly being connectable to a prime mover and ground supporting wheels being interconnected to said assembly, the axes of rotation of said ground wheels coinciding with one another and said wheels being positioned adjacent the lateral outer sides of said linkage, between the two frame portions, at least one of said tools comprising an elongated substantially horizontal tine carrier that is angularly displaceable about its own longitudinal axis against resilient opposition, said carrier extending with its longitudinal axis substantially perpendicular to the axis of rotation of the corresponding tool, said carrier being retained in a connector housing and elastically resilient material being positioned between the housing and said carrier.

2. An implement as claimed in claim 1, wherein at least one of said soil working members has downwardly extending tines and said tools include further tines that have lower soil working portions, said portions being inclined forwardly with respect to their normal direction of rotation.

3. An implement as claimed in claim 2, wherein each of said further tines has a releasable blade at the lower tip thereof.

4. An implement as claimed in claim 3, wherein said further tines are positioned to work the subsoil and the tines of said working member are positioned to work an uppermost layer of top soil.

5. An implement as claimed in claim 1, wherein said carrier is plural sided and said material includes a plurality of elongate elements positioned around the sides of said carrier.

6. An implement as claimed in claim 1, wherein each frame portion has a respective coupling member that is connectable to the three-point lifting device of a tractor and pivotal means links the two coupling members in the assembly.

7. An implement as claimed in claim 6, wherein said linkage includes lower arms that extend between lower portions of the two coupling members and said arms extend in the same general direction as the direction of implement travel, said linkage also including an upper arm of adjustable length that interconnects the upper portions of the two coupling members.

8. An implement as claimed in claim 7, wherein said lower arms co-operate with the leading frame portion with adjustable stops that limit the downward movements of the arms and the trailing frame portion.

9. An implement assembly as claimed in claim 6, wherein the coupling member of said leading frame portion is positioned at the forward side thereof and the coupling member of the trailing frame portion is positioned at the rear side thereof, cross braces interconnecting the two coupling members.

10. An implement assembly as claimed in claim 6, wherein the coupling member of each frame portion is positioned at the forward side thereof, each coupling member having an apex and adjustable arm means interconnecting the apices of said coupling members.

11. An implement as claimed in claim 1, wherein said wheels are mounted on corresponding support plates connected to the leading frame portion, adjusting means interconnecting each wheel with its support plate, whereby the level of the leading frame portion and the working members can be regulated.

* * * * *